United States Patent [19]

Nomaki et al.

[11] 4,106,930

[45] Aug. 15, 1978

[54] SOLDER ALLOYS FOR SOLDERING DIFFICULTLY SOLDERABLE MATERIAL

[75] Inventors: Koji Nomaki; Yoshihito Saoyama; Ryo Tamamura, all of Yokohama, Japan

[73] Assignee: Asahi Glass Company, Ltd., Tokyo, Japan

[21] Appl. No.: 690,176

[22] Filed: May 26, 1976

Related U.S. Application Data

[60] Division of Ser. No. 527,652, Nov. 27, 1974, abandoned, which is a continuation-in-part of Ser. No. 331,200, Feb. 9, 1973, abandoned.

[30] Foreign Application Priority Data

Feb. 19, 1972 [JP] Japan .................................. 47-17431

[51] Int. Cl.$^2$ ............................................. B23K 35/12
[52] U.S. Cl. ..................................... 75/134 B; 75/151; 75/166 C; 75/175 A
[58] Field of Search ................. 75/134 B, 151, 166 C, 75/175 A

[56] References Cited

U.S. PATENT DOCUMENTS

| | | | |
|---|---|---|---|
| 1,452,750 | 4/1923 | Mulligan | 75/134 B |
| 1,551,750 | 9/1925 | Kelly et al. | 75/134 B X |
| 2,044,671 | 6/1936 | Derr et al. | 75/134 B |
| 2,303,193 | 11/1942 | Bouton et al. | 75/166 C |
| 2,303,194 | 11/1942 | Bouton et al. | 75/166 C |
| 2,319,334 | 5/1943 | MacChesney | 75/166 C X |
| 2,515,022 | 7/1950 | Snyder et al. | 75/166 C X |
| 3,744,121 | 7/1973 | Nagano et al. | 75/166 C |
| 3,949,118 | 4/1976 | Nagano et al. | 75/166 C X |

*Primary Examiner*—M. J. Andrews
*Attorney, Agent, or Firm*—Oblon, Fisher, Spivak, McClelland & Maier

[57] ABSTRACT

Difficultly solderable materials having oxide surfaces such as glass, ceramics or metals such as Si, Ge, Al, Ti, Zr or Ta are soldered at a temperature lower than about 180° C with a solder alloy composed of 2 – 98% by wt Pb, 1 – 97.5% by wt Sn, 0.5 – 60% Cd and 0.05 – 10% by wt Zn with the simultaneous application of vibration, preferably ultrasonic vibration.

2 Claims, No Drawings

SOLDER ALLOYS FOR SOLDERING DIFFICULTLY SOLDERABLE MATERIAL

CROSS-REFERENCE TO RELATED APPLICATIONS

This is a division of application Ser. No. 527,652, filed Nov. 27, 1974, now abandoned, which is a continuation-in-part of application Ser. No. 331,200, filed Feb. 9, 1973, now abandoned.

BACKGROUND OF THE INVENTION

1. Field of the Invention

This invention relates to a process for directly soldering a difficultly solderable material such as glass or ceramics or metals such as silicon, germanium, or the like at a temperature lower than about 180° C, and to a solder alloy therefor.

2. Description of the Prior Art

In the past it has been difficult to directly apply solder to a solid inorganic oxide product, such as glass, ceramics or metals with an oxide surface such as silicon, germanium, aluminum, titanium, zirconium, tantalum or the like. Applicant has found that a solder selected from a group of alloys consisting of Pb-Sn-Zn-Sb alloys and Pb-Sn-Zn-Sb-Al alloys will firmly adhere to difficultly solderable materials when applied under the influence of ultrasonic vibration.

Such a solder alloy and a soldering process thereof have been disclosed in U.S. patent application Ser. No. 91,208, filed on Nov. 19, 1970 entitled "Process for Soldering Difficultly Solderable Metals such as Si, Ge, Al, Ti, Zr and Ta", now U.S. Pat. No. 3,744,121.

These types of special alloy solders for soldering ceramics are applicable in a temperature range of 200°–350° C which are relatively low temperatures. However, when these types of solders have been used for soldering electric or electronic components, the quality of the electric or electronic components obtained has decreased. For example, if a glass bulb of a vidicon, which is a type of camera tube, is soldered to a glass face plate, it is necessary to solder at a temperature lower than about 180° C.

A need, therefore, exists for a process for the direct soldering of materials which have oxide surfaces at temperatures lower than about 180° C.

SUMMARY OF THE INVENTION

It is an object of this invention to provide a process for the direct application of a solder alloy to a difficultly solderable material having an oxide surface at a temperature lower than about 180° C.

It is another object of this invention to provide a solder alloy which may be directly applied to a difficultly solderable material having an oxide surface at a temperature lower than about 180° C.

These objects and other objects of this invention as hereinafter will become readily apparent can be attained by using a solder alloy comprising lead, tin, cadmium and zinc with the simultaneous application of vibration, preferably ultrasonic vibration, during the soldering operation.

DETAILED DESCRIPTION OF THE PREFERRED EMBODIMENTS

The solder alloy used in this invention, has the following composition as expressed in weight percent;

| | |
|---|---|
| Pb | 2 – 98% |
| Sn | 1 – 97.5% |
| Sb | 0 – 5% |
| Cd | 0.5 – 60% |
| Zn | 0.05 – 10% |
| Bi | 0 – 5% |
| rare earth metal | 0 – 15% |

The compositions of the solder alloys for soldering ceramics or semiconductors which can be used at relatively low temperatures, are composed of Pb and Sn as the master alloy components. Zn is added to the composition to impart to the solder the ability to bind to an oxide, and Cd is added to the compositions to decrease their melting points. If necessary, Sb can be added to improve weather durability and water resistance of the compositions. A rare earth metal is added to increase the bonding strength, and Bi and Si are added to control the melting points. The Sb, Bi and rare earth metal components can be omitted from the composition.

In the solder alloy formula, Pb and Sn, respectively are in the ranges of 2 – 98% by wt and 1 – 97.5% by wt. If the quantity of Pb in the solder alloy is less than 2% by wt, and if the quantity of Sn is more than 97.5% by wt, the semi-molten condition of the molten solder alloy, that is, the temperature range in which a mixture of liquid and solid solution crystals exists, is too narrow. If said temperature range is too narrow, the molten alloy immediately solidifies from the liquid state to the solid state, which severely limits the soldering operation. On the other hand, if the Pb content of the alloy is more than 98% by wt and if the Sn content of the alloy is less than 1% by wt, the melting point and the viscosity of the solder alloy are too high resulting in an alloy with reduced smoothness and airtightness. Preferable quantities of Pb and Sn are in the range of 20–40% by wt Pb and 40–60% by wt Sn, respectively.

Zn is added to the solder alloy in order to improve the bonding strength of the solder to ceramic surfaces such as glass, pottery and semiconductors. If the quantity of Zn in the solder alloy is more than 0.05% by wt, the desired bonding effects are achieved. On the other hand, if the quantity of Zn in the solder alloy is more than 30% by wt, it is difficult to obtain a uniform structure when the solder alloy is produced. The quantity of Zn used is preferably in the range of 1 – 10% by wt.

The rare earth metal is added to the alloy in amounts less than 15% by wt. If the quantity of the rare earth metal used is more than 15% by wt, a solder alloy having a uniform structure can not be obtained. Generally, it is preferable to maintain the quantity of the rare earth metal in the alloy in the range of 1 – 10% by wt. Suitable rare earth metals include La, Ce, Pr, Nd, Pm, Sm, Eu, Gd, Tb, Dy, Ho, Er, Tm, Yb, Lu, Y and Sc. From an economical viewpoint, it is preferable to use Ce. It is especially preferable to use rare earth metal mixtures containing the cerium misch metal consisting of 86.8% Ce; 3.0% La; 4.0% Nd; 6.2% Sm and Pr, wherein the main impurities are 3.2% Fe, 0.37% Mg, 0.27% Al, and 0.73% Si by weight.

When more than 0.05% by weight Sb is added to the solder alloy, the water resistance and weather durability of the solder alloy are improved. However, if the quantity of Sb in the solder alloy is more than 5% by wt, the ductility of the alloy decreases.

The melting point of the solder alloy can be decreased by adding bismuth. However, if the quantity of Bi in the solder alloy is greater than 5% by wt, the adhesiveness of the alloy deteriorates.

Cadmium, as a component of the alloy, is important in its effectiveness for decreasing the melting point of the solder alloy. If Cd is not added to the solder alloy, the melting temperatures are too high, and the temperature range of the semi-molten condition of the alloy is too narrow. A sufficient quantity of cadmium in the alloy is in excess of 0.5% by wt. However, if the quantity of Cd in the solder alloy is more than 60% by wt, the ductility of the alloy deteriorates. The quantity of Cd is preferably in the range 5–25% by wt.

A small amount of Al can be added to the alloy to prevent the formation of a scale in the molten alloy. A small amount of at least one of the components: Si, Ti or Be can be added to the alloy to prevent cloudiness of the surface of the solder alloy. It is preferable for the alloy to contain less than 0.1% by wt aluminum, and less than 0.5% by wt of the combined amounts of Si, Ti or Be.

The following composition as expressed in weight percent is especially preferred as a high bonding strength composition.

| | |
|---|---|
| Pb | 20 – 40% |
| Sn | 40 – 60% |
| Zn | 1 – 5% |
| Cd | 5 – 25% |
| Bi | 0 – 3% |
| Sb | 0.5 – 3% |

In the process for producing the solder alloy, the metal components are melted and mixed preferably under a vacuum; an inert gas such as nitrogen or argon; or a reduced gas such as hydrogen.

The solder alloy with the formula of this invention has a melting point of 70°– 180° C and has a characteristic adhesiveness at these low temperatures. Because the alloy is applicable at significantly low temperatures, it is remarkably effective for soldering electric or electronic components which tend to deteriorate under high temperatures. The adhesiveness of the solder alloy of this invention is not superior to the conventional solder alloys, which do not contain cadmium, for soldering at relatively high temperatures. However, the solder alloy of this invention is advantageous for soldering products which require a high degree of air-tightness rather than adhesiveness.

The solder alloy of this invention will not only bond to metals with no oxide surfaces, but also to difficultly solderable materials having oxide surfaces. Suitable difficultly solderable materials include inorganic solid oxides including oxide glasses such as silicate glass or silica glass; glass-ceramics; pottery or porcelain; sintered, fused or burned regractory oxides such as alumina, magnesia, spinel, thoria, berylia, and zirconia; ceramics used for electronic or electric components such as barium titanate, ferrites, steatit, forsterite, titania; natural or synthetic inorganic oxide crystals such as quartz crystals, ruby or saphire; and cermets. The solder can also be directly applied to difficultly solderable semiconductor metals such as silicon and germanium, and difficultly solderable metals having oxide surfaces such as aluminum, titanium, zirconium and tantalum.

The solder of this invention can be firmly bonded to the surface of the difficultly solderable material by contacting the material with the solder in a molten or semi-molten state while subjected to a source of vibration, such as ultrasonic vibration. Satisfactory results can be obtained by applying the ultrasonic vibration at a frequency of 20 – 100 KHz in a direction parallel to the soldering surface. As an example, a soldering spatula is heated to a temperature between 200°– 250° C and is vibrated in a direction parallel to the soldering surface. During the operation, the soldering spatula applies a frictional force to the soldering surface which increases the activity of the oxide surface.

When soldering a material having a comparatively large heat capacity, the soldering surface is preferably preheated at about 100°– 150° C so that a strong bond is formed between the solder layer and the oxide surface. The solder layer can be usually coated on the oxide surface at a thickness ranging from 0.02 – 0.2 mm, and possibly to several millimeters.

In another process for using the solder of this invention, the vibration preferably ultrasonic vibration, is applied to the molten solder bath while the difficultly solderable material is dipped into the bath until the solder bonds to the surface of the material subjected to the molten solder. The metal or some other solderable material is then contacted with the difficultly solderable material coated with the solder. Heat is then applied to fuse the components.

In another method of bonding, two difficultly solderable materials, the surfaces of which are coated with the solder alloy of this invention, are contacted with each other, heated in the areas to be joined and then cooled.

The solder alloy of this invention can be effectively used as a base in order to join a difficultly solderable material with a conventional solder consisting mainly of Pb and Sn which is not normally solderable with the difficultly solderable material. In other words, the solder alloy of this invention is coated on the surface of a glass or ceramic substrate or the like, and then a conventional solder is coated on the solder base or a solderable material is bonded to the solder by the conventional solder.

Having generally described this invention, a further understanding can be obtained by reference to certain specific examples which are provided herein for purpose of illustration only and are not intended to be limiting unless otherwise specified.

EXAMPLE 1

Solder alloys having the various compositions shown in the Table were used for soldering a soda lime glass plate 77 mm × 27 mm × 0.9 mm in size. In the soldering process an ultrasonic vibration soldering spatula was applied to the solder heated at 180° C on the glass surface under an ultrasonic vibration frequency of 60 $KH_z$ and an amplitude of 5 $\mu$ in the direction parallel to the soldering surface to from a suitable bond to the surface.

TABLE

| | 1 | 2 | 3 | 4 | 5 | 6 | 7 |
|---|---|---|---|---|---|---|---|
| Pb | 30 | 30 | 30 | 2 | 25.4 | 84 | 25 |
| Sn | 47 | 45 | 45 | 63.75 | 50 | 2 | 20 |
| Sb | | 2 | 2 | | 1 | | 1 |
| Cd | 20 | 20 | | 32.25 | 20 | 10 | 52 |
| Zn | 3 | 3 | 3 | 2 | 0.5 | 3 | 2 |

TABLE-continued

|  | 1 | 2 | 3 | 4 | 5 | 6 | 7 |
|---|---|---|---|---|---|---|---|
| Bi |  |  | 20 |  | 1 |  |  |
| rare earth metal |  |  |  |  | 2.1 | 1.0 |  |
| solidus temperature | 143° C | 145° C | 100° C | 143° C | 142° C | 145° C | 145° C |
| liquidus temperature | 143° C | 145° C | 150° C | 177° C | 142° C | 165° C | 230° C |
| bond strength | excellent | excellent | weak | excellent | excellent | excellent | excellent |
| water resistance | fair | excellent | weak | fair | excellent | fair | fair |
| ductility | excellent | excellent | excellent | fair | excellent | excellent | poor |

In the Table, the seven types of solder alloys compositions are expressed in weight percent, and the solidus temperature, the liquidus temperature and other properties i.e. bond strength, water resistance and ductility are shown.

In the Table, the rare earth metal is the cerium misch metal consisting of 86.8% Ce, 3.0% La, 4.0% Nd, 6.2% Sm and Pr by wt along with 3.2% Fe, 0.37% Mg, 0.27% Al, and 0.73% Si by weight as impurities.

In the Table, solder alloy No. 3 is beyond the scope of this invention. Measurement of the bond strength of the solder was determined by the cutting edge of a razor which was placed at the edge of the solder layer coated on the glass plate and then moved across the glass plate in order to remove the solder layer. In the Table, the term "excellent" indicates the condition in which more than one half of the solder layer remained on the substrate surface. The term "weak" indicates the condition in which all of the solder was removed from the substrate in the bond strength test.

In the measurement of water resistance, the solder alloy coated on the glass plate was stored in an atmosphere of 100% relative humidity at 60° C for 10 days. Changes in the solder layer were observed through the opposite side of the glass plate. In the Table, the term "excellent" indicates that no changes were found in the condition of the plates after exposure of the plates to the humid atmosphere. The term "fair" indicates that the peripheral portions of the solder layers changed in color. The term "weak" indicates that the solder layers were completely removed from the glass plates.

In the ductility measurements, a strip of solder about 1 mm in diameter was formed from a block of the solder alloy. In the Table, the term "excellent" indicates that the strip was easily formed. The term "fair" indicates that the strip was formed, but sometimes the strip was severed. The term "poor" indicates that no strip of solder could be formed.

In accordance with the experiments, it was found that solder alloys containing no Cd could not be applied at the relatively low temperatures used because of the low bond strength of the alloy. On the other hand, solder alloys containing Cd, especially 10 – 20% by wt Cd had excellent adhesiveness, weather durability and ductility.

EXAMPLE 2

In an aluminous crucible, a mixture of 30% Pb, 46% Sn, 1% Sb, 20% Cd and 3% Zn by weight as the metal raw materials were supplied and were heated at 450° C for 1 hour under a nitrogen atmosphere to prepare a solder. A vidicon bulb was bonded to a face plate with the solder. The bulb was made of borosilicate glass, and was a cylinder 20 mm in diameter and 1 mm thick. A face plate mode consisting of the same borosilicate glass was a disc with a thickness of 1 mm and a diameter of 20 mm.

In the process of bonding, the face plate was placed on the end of the bulb. Solder was applied to the top of the ultrasonic vibration soldering spatula, and it was melted to coat the boundary portions of the bulb and the face plate with the molten solder. The molten solder was heated at about 170° C with the spatula.

The air-tightness of the soldered portion was measured by a helium leakage detector which determined the volume of any helium gas (normal state) which leaked under 1 atm pressure. The values obtained were calculated as atm - cc/sec.

The volume of gas leaked was less than $1 \times 10^{-10}$ atm - cc/sec. This value indicates that the product can be practically used. A remarkably low soldering temperature of about 170° C was used, and the vidicon showed no sign of strain or any other trouble and had a uniform quality and accuracy.

Having now fully described this invention, it will be apparent to one of ordinary skill in the art that many changes and modifications can be made thereto without departing from the spirit or scope of the invention as set forth herein.

What is claimed as new and desired to be secured by Letters Patent of the United States is:

1. A solder alloy for soldering a difficultly solderable material having an oxide surface which consists essentially of 2-98 wt % Pb, 1-97.5 wt % Sn, 0.5-60 wt % Cd, 0.05-10 wt % Zn, 0.05-5 wt % Sb, 0-5 wt % Bi, and 0-15 wt % of at least one rare earth metal and which is characterized by a melting point of from 70° to 180° C.

2. A solder alloy for soldering a difficultly solderable material having an oxide surface which consists essentially of 20-40 wt % Pb, 40-60 wt % Sn, 5-25 wt % Cd, 1-5 wt % Zn, 0-3 wt % Bi, and 0.5-3 wt % Sb and which is characterized by a melting point of from 70° to 180° C.

* * * * *